US008440010B2

(12) United States Patent
Endo

(10) Patent No.: US 8,440,010 B2
(45) Date of Patent: May 14, 2013

(54) INKJET PRINTING METHOD AND INK SET

(75) Inventor: Toshihiro Endo, Tokyo (JP)

(73) Assignee: Riso Kagaku Corporation, Tokyo (JP)

( * ) Notice: Subject to any disclaimer, the term of this patent is extended or adjusted under 35 U.S.C. 154(b) by 937 days.

(21) Appl. No.: 12/320,863

(22) Filed: Feb. 6, 2009

(65) Prior Publication Data

US 2009/0196994 A1    Aug. 6, 2009

(30) Foreign Application Priority Data

Feb. 6, 2008   (JP) .................................. 2008-26069

(51) Int. Cl.
*C09D 11/02*   (2006.01)

(52) U.S. Cl.
USPC .................. 106/31.27; 106/31.58; 106/31.86; 106/31.6; 106/31.26

(58) Field of Classification Search ............... 106/31.27, 106/31.6, 31.58, 31.86, 31.26
See application file for complete search history.

(56) References Cited

U.S. PATENT DOCUMENTS

| 5,713,989 | A | * | 2/1998 | Wickramanayake et al. ............. 106/31.6 |
| 5,853,465 | A | * | 12/1998 | Tsang et al. ................ 106/31.25 |
| 6,062,674 | A | | 5/2000 | Inui et al. |
| 6,102,996 | A | * | 8/2000 | Parazak ..................... 106/31.25 |
| 7,909,924 | B2 | * | 3/2011 | Krishnan et al. ........... 106/31.26 |
| 2003/0177948 | A1 | | 9/2003 | Ohkawa |
| 2005/0030360 | A1 | * | 2/2005 | Bauer et al. ..................... 347/95 |
| 2006/0061640 | A1 | * | 3/2006 | Doi .............................. 347/100 |
| 2007/0101901 | A1 | | 5/2007 | Endo et al. |
| 2008/0134932 | A1 | * | 6/2008 | Harui et al. ................ 106/31.26 |
| 2009/0038507 | A1 | * | 2/2009 | Akers et al. ................ 106/31.26 |
| 2010/0092676 | A1 | * | 4/2010 | Uozumi et al. ............... 427/265 |

FOREIGN PATENT DOCUMENTS

| CN | 1752157 A | 3/2006 |
| JP | H08-281930 A | 10/1996 |
| JP | 2003-261808 A | 9/2003 |
| JP | 2004-338361 A | 12/2004 |
| JP | 2007-126564 A | 5/2007 |

OTHER PUBLICATIONS

MSDS of Isopar H.*

* cited by examiner

*Primary Examiner* — Kaj K Olsen
*Assistant Examiner* — Veronica F Faison
(74) *Attorney, Agent, or Firm* — Fitch, Even, Tabin & Flannery, LLP

(57) ABSTRACT

In an inkjet recording system using an ink in which a coloring material is dispersed in a solvent with a dispersing agent, printing density is improved by causing aggregation of the coloring material contained in the ink that has been ejected onto a printing medium. In an inkjet printing method, printing is performed by ejecting one of first and second inks onto a printing medium, and then successively ejecting the other ink so as to overlay it on the one ink. The first ink includes a first solvent, a coloring material, and a dispersing agent. The second ink includes at least a second solvent capable of changing solubility of the dispersing agent to cause aggregation of the coloring material when it is mixed with the first ink. For example, when one of the first and second solvents includes a water-insoluble organic solvent, the other can include a water-soluble organic solvent.

12 Claims, No Drawings

INKJET PRINTING METHOD AND INK SET

CROSS-REFERENCE TO RELATED APPLICATION

This application claims foreign priority under 35 U.S.C. §119 based on Japanese 2008-26069, filed Feb. 6, 2008, the entire disclosure of which is hereby incorporated herein by reference.

TECHNICAL FIELD

The present invention relates to an inkjet printing method which improves printing density by causing aggregation of coloring materials on printing media, and an ink set used for the printing method.

BACKGROUND ART

Inkjet inks used for inkjet recording system are generally classified into aqueous inks and non-aqueous inks. Non-aqueous inks are generally classified into solvent inks composed mainly of volatile organic solvents and oil inks composed mainly of non-volatile organic solvents.

Of these, oil inks are suitable for high speed inkjet printing because the solvent is difficult to volatilize, and thus clogging in ink nozzles is unlikely to occur, thereby reducing frequency of cleaning of ink nozzles (refers to Patent Document 1 and Patent Document 2).

However, when plain paper is used as a printing medium, the oil ink is disadvantageous in that the solvent is easy to permeate into gaps between fibers of the printing paper, and consequently coloring materials are difficult to stay on the surface of the printing medium, thereby lowering printing density and causing strike through.

Conventionally, it has been proposed for an aqueous ink that printing density is improved by ejecting a cationic ink onto a site where an anionic ink has been previously ejected, whereby acid-base reaction is caused to insolubilize or aggregate coloring materials contained in these inks (refers to Patent Document 3 and Patent Document 4).

[Patent Document 1] JP-A-2003-261808
[Patent Document 2] JP-A-2007-126564
[Patent Document 3] JP-A-H8-281930
[Patent Document 4] JP-A-2004-338361

DISCLOSURE OF THE INVENTION

The present invention relates to an inkjet recording system using an ink comprising a coloring material dispersed in a solvent with a dispersing agent, and aims at improving printing density by aggregating the coloring material contained in the ink in a manner different from the conventional techniques after the ink has been ejected onto a printing medium.

In the inkjet ink, coloring materials such as pigments are dispersed in a solvent with a dispersing agent, and the dispersing state thereof is kept by equilibrium state of the dispersing agent adsorbed by the coloring material and the dispersing agent dissolved in the solvent. Thus, it is considered that destroying the equilibrium state may lead to loss of dispersibility and to aggregation of the coloring material.

As a result of diligent researches for the above mentioned object, the present inventor has found that the inkjet recording system in which printing is performed by ejecting one of first and second inks onto a printing medium, and then successively ejecting the other ink so as to overlay it on the one ink that has been ejected onto the printing medium, can be improved in printing density by using the second ink that contains a solvent having a property of changing solubility of a dispersing agent contained in the first ink so as to aggregate the coloring material contained in the first ink, and has finally completed the present invention.

That is, according to one aspect of the present invention, there is provided an inkjet printing method which comprises ejecting one of first and second inks onto a printing medium, and then successively ejecting the other ink so as to overlay it on the one ink, wherein the first ink comprises at least a first solvent, a coloring material and a dispersing agent for said coloring material, and the second ink comprises at least a second solvent capable of changing solubility of said dispersing agent so as to cause aggregation of said coloring material when the second ink is mixed with the first ink.

According to another aspect of the present invention, there is provided an ink set for inkjet printing by ejecting one of first and second inks onto a printing medium, and then successively ejecting the other ink so as to overlay it on the one ink, comprising the first ink which comprises at least a first solvent, a coloring material and a dispersing agent for said coloring material, and the second ink which comprises at least a second solvent capable of changing solubility of said dispersing agent so as to cause aggregation of said coloring agent when the second ink is mixed with the first ink.

According to a preferable embodiment of the present invention, one of the first and second solvents comprises a water-insoluble organic solvent, and the other comprises a water-soluble organic solvent. The first ink comprises a coloring material and a dispersing agent therefor as essential components, and the second ink does not have to comprise a coloring material and a dispersing agent therefor, but it is preferable that the second ink also comprises a coloring material and a dispersing agent therefor in order to improve printing density. As the coloring material, pigments such as carbon black and copper phthalocyanine are preferably used.

According to the present invention, when printing is conducted by ejecting the first and second inks onto a printing medium so as to overlap and mix each other, there is used, as the solvent of the second ink, a solvent which is capable of changing solubility of the dispersing agent for the coloring material contained in the first ink to cause aggregation of the coloring material when the second ink is mixed with the first ink. Thus, the coloring material does not permeate through the printing medium, but stays at a surface thereof, thereby improving printing density.

BEST MODE FOR CARRYING OUT THE INVENTION

Hereinafter, the present invention will be described in detail.

1. The First Ink

The first ink used in the present invention is not particularly limited as long as it comprises at least a first solvent, a coloring material and a dispersing agent for the coloring material.

1-1. The First Solvent

As the first solvent, water and water-soluble organic solvents can be used in case of an aqueous ink. Water-insoluble organic solvents and water-soluble organic solvents can be used in case of a non-aqueous ink. However, when plain paper is used as a printing medium, the aqueous ink tends to generate curl of the printing paper. Therefore, the non-aqueous ink is preferably used in order to avoid generation of curl of printing paper.

1-1-1. Water-insoluble Organic Solvents

The water-insoluble organic solvent includes hydrocarbon solvents, higher fatty acid ester solvents, higher fatty acid solvents, higher alcohol solvents, and the like. These can be used alone or in combination of two or more.

The hydrocarbon solvent includes, for example, petroleum based hydrocarbon solvents including naphthenic, paraffinic and isoparaffinic ones. Concrete examples include ISOPAR and EXXOL (both trade names) available from Exxon Mobil Corporation, AF solvents (trade name) available from Nippon Oil Corporation, SUNSEN and SUNPAR (both trade names) available from Japan Sun Oil., Ltd., and the like.

The higher fatty acid ester solvents includes, for example, fatty acid esters having 5 or more, preferably 9 or more and more preferably 12 to 32 carbon atoms in one molecule. Concrete examples include isopropyl palmitate, hexyl palmitate, isooctyl palmitate, isostearyl palmitate, isooctyl isopalmitate, butyl stearate, hexyl stearate, isooctyl stearate, isopropyl isostearate, 2-octyldodecyl pivalate, methyl laurate, isopropyl laurate, isopropyl myristate, methyl oleate, ethyl oleate, isopropyl oleate, butyl oleate, hexyl oleate, methyl linoleate, ethyl linoleate, isobutyl linoleate, soybean oil methyl ester, soybean oil isobutyl ester, tall oil methyl ester, tall oil isobutyl ester, diisopropyl adipate, diisopropyl sebacate, diethyl sebacate, propylene glycol monocapric ester, trimethylolpropane tri-2-ethylhexanoic ester, and glycerol tri-2-ethylhexanoic ester.

The higher fatty acid solvent includes, for example, fatty acids having 4 or more, preferably 9-22 carbon atoms in one molecule. Concrete examples include isononanoic acid, isomyristic, acid, hexadecanoic acid, isopalmitic acid, oleic acid, and isostearic acid.

The higher alcohol solvent includes, for example, aliphatic alcohols having 12 or more carbon atoms in one molecule. Concrete examples include isomyristyl alcohol, isopalmityl alcohol, isostearyl alcohol, and oleyl alcohol.

Of the above mentioned water-insoluble organic solvents, hydrocarbon solvents, higher fatty acid ester solvents and higher alcohol solvents are preferably used. These water-insoluble organic solvents can be used alone or in combination of two or more.

1-1-2. Water-soluble Organic Solvents

The water-soluble organic solvent includes, for example, glycol solvents, glycol ethers, acetates of glycol ethers, lower alcohols, glycerin, diglycerin, triglycerin, polyglycerins, imidazoridinone solvents, and 3-methyl-2,4-pentanediol. These can be used alone or in combination of two or more.

The glycol solvent includes, for example, alkylene glycols such as ethylene glycol, diethylene glycol, triethylene glycol and propylene glycol.

The glycol ether includes alkylene glycol alkyl ether and polyalkylene glycol alkyl ether (both collectively referred to as (poly)alkylene glycol alkyl ether in this specification), and concrete examples thereof include compounds represented by the following formula (1).

$$R^1\!-\!O(C_2H_4\!-\!O)_n\!-\!R^2 \quad (1)$$

In formula (1), $R^1$ and $R^2$ each independently represent a hydrogen atom or an alkyl group having 1-6, preferably 4-6 carbon atoms, at least one of $R^1$ and $R^2$ represents the alkyl group, and n is an integer of 1 to 4.

Specific examples of (poly)alkylene glycol alkyl ethers represented by the above mentioned formula (1) include, for example, ethylene glycol monobutyl ether, diethylene glycol monomethyl ether, diethylene glycol monoethyl ether, diethylene glycol monopropyl ether, diethylene glycol monobutyl ether, triethylene glycol monomethyl ether, triethylene glycol monoethyl ether, triethylene glycol monopropyl ether, triethylene glycol monobutyl ether, triethylene glycol monohexyl ether, tetraethylene glycol monomethyl ether, tetraethylene glycol monoethyl ether, tetraethylene glycol monopropyl ether, tetraethylene glycol monobutyl ether, diethylene glycol diethyl ether, diethylene glycol dibutyl ether, triethylene glycol diethyl ether and triethylene glycol dibutyl ether.

Another example of (poly)alkylene glycol alkyl ethers include compounds represented by the following formula (2).

$$R^1\!-\!O(C_3H_6\!-\!O)_n\!-\!R^2 \quad (2)$$

In formula (2), $R^1$ and $R^2$ each independently represent a hydrogen atom or an alkyl group having 1-6, preferably 4-6 carbon atoms, at least one of $R^1$ and $R^2$ represents the alkyl group, and n is an integer of 1 to 4.

Specific examples of (poly)alkylene glycol alkyl ethers represented by the above mentioned formula (2) include, for example, propylene glycol monobutyl ether, propylene glycol dibutyl ether, dipropylene glycol monomethyl ether, dipropylene glycol monoethyl ether, dipropylene glycol monopropyl ether, dipropylene glycol monobutyl ether, tripropylene glycol monomethyl ether, tripropylene glycol monoethyl ether, tripropylene glycol monopropyl ether, tripropylene glycol monobutyl ether, tetrapropylene glycol monomethyl ether, dipropylene glycol dibutyl ether and tripropylene glycol dibutyl ether.

The lower alcohol includes, for example, aliphatic alcohols having 1-6 carbon atoms in one molecule. Concrete examples include ethyl alcohol, propyl alcohol, isopropyl alcohol and butyl alcohol.

Of these water-soluble organic solvents, glycol solvents, glycol ethers, glycerin, diglycerin, triglycerin and polyglycerins are preferably used. These water-soluble organic solvents can be used alone or in combination of two or more.

1-2. Coloring Materials

The coloring material used in the present invention is not particularly limited as long as it is aggregated and improved in printing density by the printing method of the present invention, but is preferably a pigment. As the pigment, pigments generally used in the technical field of printing, including organic and inorganic pigments, can be used without any particular limitation. Examples thereof which can preferably be used include carbon black, cadmium red, chromium yellow, cadmium yellow, chromium oxide, viridian, titanium cobalt green, ultramarine blue, Prussian blue, cobalt blue, azo pigments, phthalocyanine pigments, quinacridone pigments, isoindolinone pigments, dioxadine pigments, threne pigments, perylene pigments, thioindigo pigments, quinophthalone pigments and metal complex pigments.

These pigments may be used alone or in combination of two or more.

The pigment is contained preferably in an amount of 0.01 to 20 wt. % based on the total weight of the ink.

1-3. Dispersing Agents

The dispersing agent used in the present invention can be properly selected from known dispersing agents in accordance with solvents and coloring materials to be used.

The dispersing agent which can be used for dispersing the above pigment in the above organic solvent include, for example, a hydroxyl group-containing carboxylic acid ester, a salt of a long-chain polyaminoamide and a high-molecular weight acidic ester, a salt of a high molecular weight polycarboxylic acid, a salt of a long-chain polyaminoamide and a polar acidic ester, a high molecular weight unsaturated acidic ester, a high molecular weight copolymer, a modified polyurethane, a modified polyacrylate, a polyetherester type anionic surfactant, a naphthalene sulfonic acid formalin condensate salt, a polyoxyethylene alkylphosphoric acid ester, a polyoxyethylene nonylphenyl ether, a polyesterpolyamine, a stearylamine acetate and the like. Of these, high molecular weight dispersing agents are preferably used.

Examples of such pigment-dispersing agents include SOLSPERSE 5000 (phthalocyanine ammonium salt based), 13940 (polyester amine based), 17000, 18000 (fatty acid amine based), 11200, 22000, 24000, and 28000 (all trade names) available from Lubrizol Japan Ltd.; EFKA 400, 401, 402, 403, 450, 451, 453 (modified polyacrylate), 46, 47, 48, 49, 4010, 4055 (modified polyurethane) (all trade names) available from Efka Chemicals; DEMOL P, EP, POIZ 520, 521, 530, HOMOGENOL L-18 (polycarboxylate polymer type surfactants) (all trade names) available from Kao Corporation; DISPARLON KS-860, KS-873N4 (high molecular weight polyester amine salt) (all trade names) available from Kusumoto Chemicals, Ltd.; and DISCOL 202, 206, OA-202, OA-600 (multi chain polymer based nonionic) (all trade names) available from Daiichi Kogyo Seiyaku Co., Ltd.

Of the above pigment-dispersing agents, a polyamide-based dispersing agent that has a pectinated structure constituted by a plurality of side chains composed of polyester is preferably used. The polyamide-based dispersing agent that has a pectinated structure constituted by a plurality of side chains composed of polyester is a compound which has a main chain containing many nitrogen atoms such as polyethyleneimine and has a plurality of side chains that are bonded to the nitrogen atoms through amide-linkage in which the side chains are polyesters. Examples thereof include dispersing agents with a structure that has a main chain formed of polyalkyleneimine such as polyethyleneimine to which poly(carbonyl-$C_{3-6}$-alkyleneoxy) chains are bonded as side chains through amide-linkage in which the poly(carbonyl-$C_{3-6}$-alkyleneoxy) chains each contain 3 to 80 carbonyl-$C_{3-6}$-alkyleneoxy groups, as is disclosed in JP-A-H5-177123 and the corresponding U.S. Pat. No. 4,645,611 the disclosure of which is incorporated herein by reference. The above SOLSPERSE 11200 and SOLSPERSE 28000 (all trade names) available from Lubrizol Japan Ltd. correspond to the polyamide-based dispersing agent having such a pectinated structure.

Content of the above dispersing agent only has to be an amount in which the above pigment can be sufficiently dispersed in the ink, and may be set properly.

1-4. Other Components

In addition to the above solvents, coloring materials and dispersing agents, other components such as dyes, surfactants and antiseptics can be added to the first ink of the present invention as long as they do not adversely affect the property of the ink.

1-5. Production Method of the Ink

The first ink of the present invention can be prepared by putting the whole or part of the components in a known dispersing machine such as a beads mill to obtain a dispersion and if necessary passing it through a known filtering machine such as a membrane filter. Specifically, the ink can be prepared by previously mixing part of the solvent with the whole of the coloring materials and the dispersing agent uniformly and dispersing the mixture in a dispersing machine, and then adding the rest of the components to the resulting dispersion followed by filtration.

When a water-insoluble solvent is used as the first solvent, the first ink of the present invention may be a water-in-oil (W/O) emulsion ink in order to further improve printing density. In this case, content of water in the water-in-oil (W/O) emulsion ink is preferably 20% or lower relative to the total of water and the water-insoluble organic solvent. Excessive water would cause the curl when plain paper is used as a printing medium. The water-in-oil (W/O) emulsion ink can be produced by, for example, the production method described in JP-A-2006-56931.

1-6. Properties of the Ink

Viscosity at 23° C. of the inkjet ink of the present invention thus produced is adjusted to preferably 5 to 30 mPa·s, more preferably 7 to 14 mPa·s, which is suitable for ejecting the ink from an inkjet head nozzle. Preferably, the solidifying point of the ink is adjusted to −5° C. or lower so that the ink does not freeze under storage conditions.

2. The Second Ink

The second ink used in the present invention only has to comprise the following second solvent.

2-1. The Second Solvent

It is required that the second solvent used in the second ink of the present invention is one which can be mixed with the first solvent to change solubility of the dispersing agent and cause aggregation of the coloring material. Also, it is required that the second solvent has miscibility to some extent with the first solvent.

In the first ink, the coloring material such as pigments are dispersed in the solvent with the dispersing agent, and the dispersion state thereof is considered to be kept by the equilibrium state of the dispersing agent adsorbed by the coloring material and the dispersing agent dissolved in the solvent. Therefore, when the second solvent that is low in solubility of the dispersing agent contained in the first ink is mixed with the first ink, the equilibrium state is destroyed, and thus the dispersing agent is precipitated whilst the coloring materials are aggregated. Conversely, when the second solvent that is high in solubility of the dispersing agent contained in the first ink is mixed with the first ink, the dispersing agent comes in short supply so that dispersibility becomes weak, and thus the equilibrium state is destroyed, thereby causing the coloring material to aggregate.

Specifically, when the water-insoluble organic solvent is used as the first solvent, the water-soluble organic solvent can be used as the second solvent so that both are mixed with each other to destroy the above equilibrium state and cause aggregation of the coloring material. When the water-soluble organic solvent is used as the first solvent, water may be used as the second solvent so that both are mixed with each other to destroy the above equilibrium state and cause aggregation of the coloring material. However, when water is used as the second solvent, curl of printing paper may occur if plain paper is used as the printing medium. Therefore, in order to prevent the occurrence of curl, it is preferable to use a water-insoluble organic solvent or water-soluble organic solvent as the second solvent.

As the water-insoluble organic solvent and water-soluble organic solvent used as the second solvent, can be used one which is properly selected from those described above concerning the first solvent.

2-2. Other Components

The second ink used in the present invention may further comprise a coloring material and a dispersing agent for the coloring material in order to improve printing density when it is ejected so as to overlap with the first ink.

As the coloring materials, can be used one which is properly selected from those described above concerning the first solvent, and pigments are preferably used. In order to improve printing density, it is usually preferable that the second ink contains the same coloring material as that contained in the first ink. Black inks can be improved in printing density by printing a cyan ink so as to overlap with the black ink. Therefore, for example, when the first ink comprises carbon black and/or copper phthalocyanine, printing density of black or cyan color can be improved by using the second ink which comprises carbon black and/or copper phthalocyanine. Usually, a color inkjet ink has respective inks of cyan (C), yellow (Y), magenta (M) and black (K). Thus, the present invention can be easily practiced by providing one of the cyan (C) ink and the black (K) ink as the first ink of the present invention, and providing the other ink as the second ink of the present invention.

As the dispersing agent, can be used one which is properly selected from those described above concerning the first solvent, but it is necessary to appropriately select one that fits the selected second solvent because the first and second solvents are different from each other in nature.

In addition to the above solvents, coloring materials and dispersing agents, other components such as dyes, surfactants, and antiseptics can be added to the second ink of the present invention as long as they do not adversely affect the property of the ink.

2-3. Production Method and Properties of the Ink

As to the production method and properties of the second ink of the present invention, those described above concerning the first ink are applied thereto as they are.

3. Inkjet Printing Method

The inkjet printing method of the present invention is conducted by ejecting one of the first and second inks onto a printing medium, and then successively ejecting the other ink so as to overlay it on the one ink. Since it is essential in the present invention to mix the first and second inks together on the printing medium, it is necessary to print both inks to overlap with each other by successively ejecting the other ink immediately after the one ink has been ejected and before the one ink permeates into the inside of the printing medium.

Meanwhile, it is advantageous to constitute and market an ink set comprising at least the first and second inks in order to make it easier to carry out the inkjet printing method of the present invention.

For example, when an ordinary inkjet printer equipped with an ink head having ejection nozzles for cyan (C), yellow (Y), magenta (M) and black (K) is used to conduct the printing method of the present invention in order to improve printing density of black color, the printing method of the present invention can be easily conducted by preparing a black ink as the first ink and a cyan ink as the second ink, and controlling the inkjet printer so that when the black ink is ejected onto a printing medium, the cyan ink is successively ejected so as to overlay it on the site which has been printed by the black ink. Conversely, the black ink may be prepared as the second ink and the cyan ink as the first ink. Further, two kinds of black ink may be equipped with a printer whilst one is prepared as the first ink and the other as the second ink.

In the present invention, the printing medium is not particularly limited, and may be plain paper, glossy paper, specialty paper, fabrics, films, OHP sheets, and the like. Especially, according to the present invention, even when oil inks are used for printing plain paper, coloring materials such as pigments stay on the surface of printing paper without permeating through the printing paper, and thus great advantages result including improvement of printing density and decrease in strike through.

EXAMPLE

Hereinafter, the present invention will be described in detail by way of Examples and Comparative Examples, however, the present invention is not limited to these examples.

Production Examples (Ink Nos. 1-5, 8 and 9)

The components shown in Table 1 were premixed in the ratio shown in Table 1, and then the mixture was dispersed in a beads mill (using zirconium beads having a diameter ($\phi$) of 0.5 mm). The resulting dispersion was filtered with a membrane filter (having pores of 3 μm in diameter) to prepare an inkjet ink. The amount of each component to be blended is indicated in mass % in Table 1.

Production Examples (Ink Nos. 6 and 7)

The components shown in Table 1 other than water were premixed in the ratio shown in Table 1, and then the mixture was dispersed in a beads mill (using zirconium beads having a diameter ($\phi$) of 0.5 mm). The resulting dispersion was filtered with a membrane filter (having pores of 3 μm in diameter) to obtain a pigment dispersion.

A water-in-oil (W/O) emulsion ink was prepared by placing the resulting pigment dispersion in a high-speed homogenizer PHYSCOTRON available from Microtech Nichion, dropping water under stirring for 5 minutes at 3,000 rpm until the compositional ratio shown in Table 1 was met, and then stirring for 5 minutes at 10,000 rpm.

Examples 1-9, Comparative Examples 1-3

Two kinds of ink shown in Table 2 was selected from nine kinds of ink shown in Table 1, and introduced respectively to the first ink ejection route and the second ink ejection route of the inkjet printer HC5500 (trade name; manufactured by RISO KAGAKU CORPORATION). Using plain paper (RISO-YOSHI, Usukuchi (trade name; manufactured by RISO KAGAKU CORPORATION)) as printing paper, solid image was printed such that ink dots ejected from the first ink ejection route onto the printing paper were overlaid with ink dots ejected from the second ink ejection route. Printing density (OD) value of the resulting print was measured with an optical densitometer (RD920: manufactured by Macbeth) and evaluated according to the following standards. Also, degree of curl occurring on the print was evaluated visually according to the following standards. The results are shown in Table 2.

Evaluation Standards for Printing Density:
⊚: 1.2≦OD value
○: 1.1≦OD value<1.2
×: OD value<1.1

Evaluation Standards for Curl of Prints
○: no curl
Δ: a little curl
×: apparent curl

TABLE 1

| | | Ink No. | | | | | | | | |
|---|---|---|---|---|---|---|---|---|---|---|
| | | 1 | 2 | 3 | 4 | 5 | 6 | 7 | 8 | 9 |
| Pigment | Carbon black (MA8) | 8 | 8 | 8 | 8 | 8 | 8 | 8 | | |
| | Copper phthalocyanine | | | | | | | | 8 | 8 |
| Dispersing | S28000 | 4 | 4 | 4 | 4 | 2 | 2 | 2 | 4 | 2 |
| agent | S11200 | | | | | 2 | 2 | 2 | | 2 |

TABLE 1-continued

|  |  | Ink No. | | | | | | | | |
|---|---|---|---|---|---|---|---|---|---|---|
|  |  | 1 | 2 | 3 | 4 | 5 | 6 | 7 | 8 | 9 |
| Water-insoluble organic solvent | Higher fatty acid ester solvent (soybean oil methyl ester) |  |  |  |  | 28 | 23 | 23 |  | 28 |
|  | Hydrocarbon solvent (AF4) |  |  |  |  | 40 | 50 | 40 |  | 40 |
|  | Higher alcohol solvent (isomyristyl alcohol) | 10 | 10 | 10 | 10 | 20 |  |  | 10 | 20 |
| Water-soluble organic solvent | Diethylene glycol monoethyl ether | 78 |  |  |  |  |  |  | 78 |  |
|  | Ethylene glycol monobutyl ether |  | 78 |  |  |  |  |  |  |  |
|  | Ethylene glycol |  |  | 78 |  |  |  |  |  |  |
|  | Triethylene glycol monobutyl ether |  |  |  | 78 |  |  |  |  |  |
| Water | Ion exchanged water |  |  |  |  |  | 10 | 20 |  |  |
| Surfactant | Hydrogenated caster oil |  |  |  |  |  | 5 | 5 |  |  |
| Total |  | 100 | 100 | 100 | 100 | 100 | 100 | 100 | 100 | 100 |

Symbols in Tables 1 mean the followings;

Carbon black (MA8): MA8 (trade name) available from Mitsubishi Chemical Corporation.

S28000: SOLSPERSE 28000 (trade name), a dispersing agent available from Lubrizol Japan Ltd.

S11200: SOLSPERSE 11200 (trade name), a dispersing agent available from Lubrizol Japan Ltd, comprising 50% of aliphatic hydrocarbon (non-polar) solvent.

Hydrocarbon solvent (AF4): AF4 (trade name), petroleum based hydrocarbon solvent available from Nippon Oil Corporation.

TABLE 2

|  | Example | | | | | | | | | Comparative Example | | |
|---|---|---|---|---|---|---|---|---|---|---|---|---|
|  | 1 | 2 | 3 | 4 | 5 | 6 | 7 | 8 | 9 | 1 | 2 | 3 |
| The first ink ejection route | No. 5 | No. 5 | No. 5 | No. 5 | No. 6 | No. 7 | No. 1 | No. 5 | No. 9 | No. 1 | No. 5 | No. 5 |
| The second ejection route | No. 1 | No. 2 | No. 3 | No. 4 | No. 1 | No. 1 | No. 5 | No. 8 | No. 1 | No. 8 | No. 9 | No. 6 |
| Printing density | ○ | ○ | ○ | ○ | ◎ | ◎ | ○ | ○ | ○ | X | X | X |
| Curl of prints | ○ | ○ | ○ | ○ | ○ | Δ | ○ | ○ | ○ | ○ | ○ | ○ |

From the results of Table 2, the following is clear.

In Examples 1-4 where the second ink (Nos. 1-4) containing a water-soluble organic solvent as a solvent was printed so as to overlay it on the first ink (No. 5) containing a water-insoluble organic solvent as a solvent, printing density was improved and curl of prints did not occur.

In Examples 5-6 where the second ink (No. 1) containing a water-soluble organic solvent as a solvent was printed so as to overlay it on the first ink (Nos. 6-7) which was a W/O emulsion ink, printing density was highly improved, however, in Example 6 where the first ink (No. 7) high in water content was used, a little curl of prints occurred.

In Example 7 where the second ink (No. 5) containing a water-insoluble organic solvent as a solvent was printed so as to overlay it on the first ink (No. 1) containing a water-soluble solvent as the solvent, printing density was improved and curl of prints did not occur.

In Example 8 where an experiment was carried out in the same manner as Example 1 except using the second ink (No. 8) which contained copper phthalocyanine in place of carbon black as a pigment, printing density was improved and curl of prints did not occur.

In Example 9 where an experiment was carried out in the same manner as Example 1 except using the first ink (No. 9) which contained copper phthalocyanine in place of carbon black as a pigment, printing density was improved and curl of prints did not occur.

In Comparative Example 1 where an experiment was carried out in the same manner as Example 8 except using the first ink (No. 1) which contained a water-soluble organic solvent in place of a water-insoluble organic solvent as a solvent, no improvement of printing density was observed.

In Comparative Example 2 where an experiment was carried out in the same manner as Example 8 except using the second ink (No. 9) which contained a water-insoluble organic solvent in place of a water-soluble organic solvent as a solvent, no improvement of printing density was observed.

In Comparative Example 3 where an experiment was carried out in the same manner as Example 1 except using the second ink (No. 6) which was a W/O emulsion ink containing a water-insoluble organic solvent in place of a water-soluble organic solvent as an organic solvent, no improvement of printing density was observed similarly to Comparative Example 2.

INDUSTRIAL APPLICABILITY

The inkjet printing method and ink set of the present invention can be easily practiced in an inkjet printer which can print by successively ejecting the first and second inks from a nozzle head so as to overlay them on a printing medium, and thus can be used widely in the field of inkjet printing.

The invention claimed is:

1. An ink set for inkjet printing by ejecting one of first and second inks onto a printing medium, and then successively ejecting the other ink so as to overlay it on the one ink, comprising:

the first ink which comprises at least a first solvent, a coloring material and a dispersing agent for said coloring material, and the second ink which comprises at least a second solvent capable of changing solubility of said dispersing agent so as to cause aggregation of said coloring agent when the second ink is mixed with the first ink, wherein one of the first and second solvents comprises a water-insoluble organic solvent, and the other comprises a water-soluble organic solvent.

2. An ink set according to claim 1, wherein said water-insoluble organic solvent is at least one selected from the group consisting of hydrocarbon solvents, higher fatty acid ester solvents, higher fatty acid solvents and higher alcohol solvents.

3. An ink set according to claim 1, wherein said ink comprising said water-insoluble organic solvent is a water-in-oil (W/O) emulsion ink.

4. An ink set according to claim 3, wherein said water-in-oil (W/O) emulsion ink has a water content of 20% or less relative to the total of water and said water-insoluble organic solvent.

5. An ink set according to claim 1, wherein said water-soluble organic solvent is at least one selected from the group consisting of glycol solvents, glycol ethers, acetates of glycol ethers, lower alcohols, glycerin, diglycerin, triglycerin, polyglycerins, imidazolidinone solvents and 3-methyl-2,4-pentanediol.

6. An ink set according to claim 1, wherein the first ink comprises a pigment as a coloring material, and comprises, as a dispersing agent for said coloring material, a polyamide-based dispersing agent that has a pectinated structure constituted by a plurality of side chains composed of polyesters.

7. An ink set according to claim 1, wherein the second ink further comprises a coloring material and a dispersing agent for said coloring material.

8. An ink set according to claim 7, wherein said coloring material contained in the first ink comprises carbon black and/or copper phthalocyanine, and said coloring material contained in the second ink comprises carbon black and/or copper phthalocyanine.

9. An ink set according to claim 8, wherein said coloring material contained in the second ink is the same as said coloring material contained in the first ink.

10. An ink set according to claim 1, wherein said water-insoluble organic solvent is at least one selected from the group consisting of hydrocarbon solvents, higher fatty acid ester solvents, and higher alcohol solvents.

11. An ink set for inkjet printing by ejecting one of first and second inks onto a printing medium, and then successively ejecting the other ink so as to overlay it on the one ink, comprising:

the first ink which comprises at least a first solvent, a coloring material and a dispersing agent for said coloring material, and the second ink which comprises at least a second solvent capable of changing solubility of said dispersing agent so as to cause aggregation of said coloring agent when the second ink is mixed with the first ink, wherein one of the first and second solvents comprises a water-insoluble organic solvent, and the other consists essentially of a water-soluble organic solvent.

12. An ink set for inkjet printing by ejecting one of first and second inks onto a printing medium, and then successively ejecting the other ink so as to overlay it on the one ink, comprising:

the first ink which comprises at least a first solvent, a coloring material and a dispersing agent for said coloring material, and the second ink which comprises at least a second solvent capable of changing solubility of said dispersing agent so as to cause aggregation of said coloring agent when the second ink is mixed with the first ink, wherein one of the first and second solvents comprises a water-insoluble organic solvent, and the other comprises a water-soluble organic solvent, and the ink set contains up 10 wt. % or less of water.

\* \* \* \* \*